UNITED STATES PATENT OFFICE.

WILHELM MATT, OF NEW YORK, N. Y., ASSIGNOR, BY MESNE ASSIGNMENTS, TO PATENT MARBLE VENEER COMPANY, OF NEW YORK, N. Y.

ARTIFICIAL STONE FOR VENEERS, &c.

SPECIFICATION forming part of Reissued Letters Patent No. 10,343, dated June 19, 1883.

Original No. 266,493, dated October 24, 1882. Application for reissue filed May 25, 1883.

*To all whom it may concern:*

Be it known that I, WILHELM MATT, a resident of the city, county, and State of New York, have invented a new and useful Composition of Matter or Artificial Stone for Veneers, Molded Articles, &c.; and I do hereby declare that the following is a full, clear, and exact description of the same.

My invention relates to a new composition of matter for use as a veneer or artificial surface for wood, plaster, papier-maché, ceramics, &c. It is obtained in the best manner by first soaking about six pounds of the best clear glue in about six pounds of soft water for from six to eight hours and then dissolving it completely by applying thereto a gentle heat and stirring it. In the meantime about three-fourths of a pound of white rosin is dissolved in one and one-half pound of boiled linseed-oil under the influence of heat, and the hot solution of oil and rosin is slowly poured into the dissolved glue, the mixture being thoroughly stirred to render it of uniform consistency and to keep down the foam, which will at first arise, the stirring being continued so long as air-bubbles make their appearance. To the hot solution of glue, oil, and rosin produced, as above, I add one-fourth pound of glycerine and one pound of paper-pulp, as produced in a paper-mill, and thoroughly stir and agitate the mass by suitable mechanical devices until the fibers are equally distributed therein. The compound is then passed through a fine sieve of brass wire with the aid of a coarse brush to remove any coarse particles which may remain therein, and it is stiffened to the proper consistency by the addition thereto of French chalk, china-clay, or other equivalent thickening material. This compound admits of being colored by the addition of suitable pigments, such as taste, fancy, and the character of the work to be produced therewith may require. The plastic compound thus produced is made ready for use as a veneer by being rolled out upon a hard slab into thin sheets, which are united to the surface to be covered by coating the sheet of composition and the surface to be veneered each with a film of hot glue in thin solution and then pressing the two together, as in the ordinary process of veneering in wood. In this manner not only all manner of wood surfaces may be veneered with the compound, but it may be applied to plaster walls, to papier-maché, and, in fact, to all surfaces to which the glue will adhere. The composition will harden within twenty-four hours and become as hard as stone, and presents a smooth finished surface, which admits of receiving a very high polish. This polish may be produced by first rubbing down with pumice-stone and oil of turpentine and finishing with sandarac polish in the customary manner. When applied to a wooden surface this composition adheres so closely as to become apparently an integral part thereof.

For producing an imitation of marble with this compound the suitable colors are each mixed separately with finely-pulverized steatite or kaolin, and, having been thoroughly incorporated therewith and sifted, are each placed in a separate heap upon a marble slab. The center of each heap is hollowed out to receive a quantity of the hot fluid solution of glue, oil, or rosin, paper-pulp, and glycerine sufficient to reduce the mass to a plastic condition. When the several colors are thus made ready, each in the form of paste of proper consistency, they are kept ready for use by enfolding them in a damp cloth. When required for use the separate masses of color are steamed until heated through and through and fully softened, and are placed upon the marble slabs in rolls, which are properly laid together and interfolded, rolled out with a suitable metallic roller, folded, and again rolled into a thin sheet, which will finally become veined in a beautiful imitation of marble.

I am aware that glue, rosin, linseed-oil, paper-pulp, and whiting have been heretofore combined to produce a composition of matter for forming molded ornaments, as set forth in Letters Patent No. 246,391, dated August 30, 1881, and No. 250,257, dated November 29, 1881; but said compositions are not adapted for use as a veneer because of the relative proportions of the ingredients and the nature thereof. In the proportions specified in said patents the ingredients named produce a composition which is so far brittle and non-elastic as to be wholly unsuitable for use as a veneer, and which, when applied to a wooden or other surface in a thin sheet, will crack and peel off therefrom. My invention differs from said patented compositions and from all others of a similar character in that, when properly applied, as herein described, to any suitable surface, it will adhere thereto so firmly as to become homogeneous therewith and form thereon an extremely hard coating, admitting of high polish, and which will not break or peel off, but will in some cases be even more durable than the body of the article. This difference is due, first, to a radical difference in the proportions of such of the ingredients as are common to both, and especially in the proportion of glue employed therein, which in my invention amounts to some two hundred per cent., whereas in the patented compositions above named the percentage in one is but fifty and in the other one hundred per cent. of the entire quantity. It is due, secondly, to the addition of glycerine to the compound, whereby in connection with the increased proportion of glue the compound becomes tough and elastic; and it is due, thirdly, to the substitution of steatite or kaolin for whiting, whereby the tendency to brittleness in the composition is still further obviated.

The proportions of the several ingredients herein named are those best adapted to produce the desired results. They may, however, be slightly varied without departing from my invention.

I claim as my invention—

1. A composition of matter for veneering or molding purposes produced by an admixture in substantially the proportions and manner described, of a solution of glue with rosin, linseed-oil, paper-pulp, glycerine, and steatite or its equivalent, substantially in the manner and for the purposes set forth.

2. A composition of matter for veneering and marbleizing purposes produced by an admixture in substantially the proportions and manner described, of a solution of glue with rosin, linseed-oil, paper-pulp, glycerine, steatite or its equivalent, and coloring pigments, substantially in the manner and for the purposes set forth.

3. The composition herein specified, composed of glue, rosin, linseed-oil, paper-pulp, glycerine, and steatite or its equivalent, as set forth.

4. The composition herein specified, composed of glue, rosin, linseed-oil, paper-pulp, glycerine, steatite, or its equivalent, and coloring pigments, as set forth.

Signed by me this 15th day of May, A. D. 1883.

WILHELM MATT.

Witnesses:
ABRAHAM L. JACOBS.
CHAS. PUTZEL.